United States Patent Office 2,894,357
Patented July 14, 1959

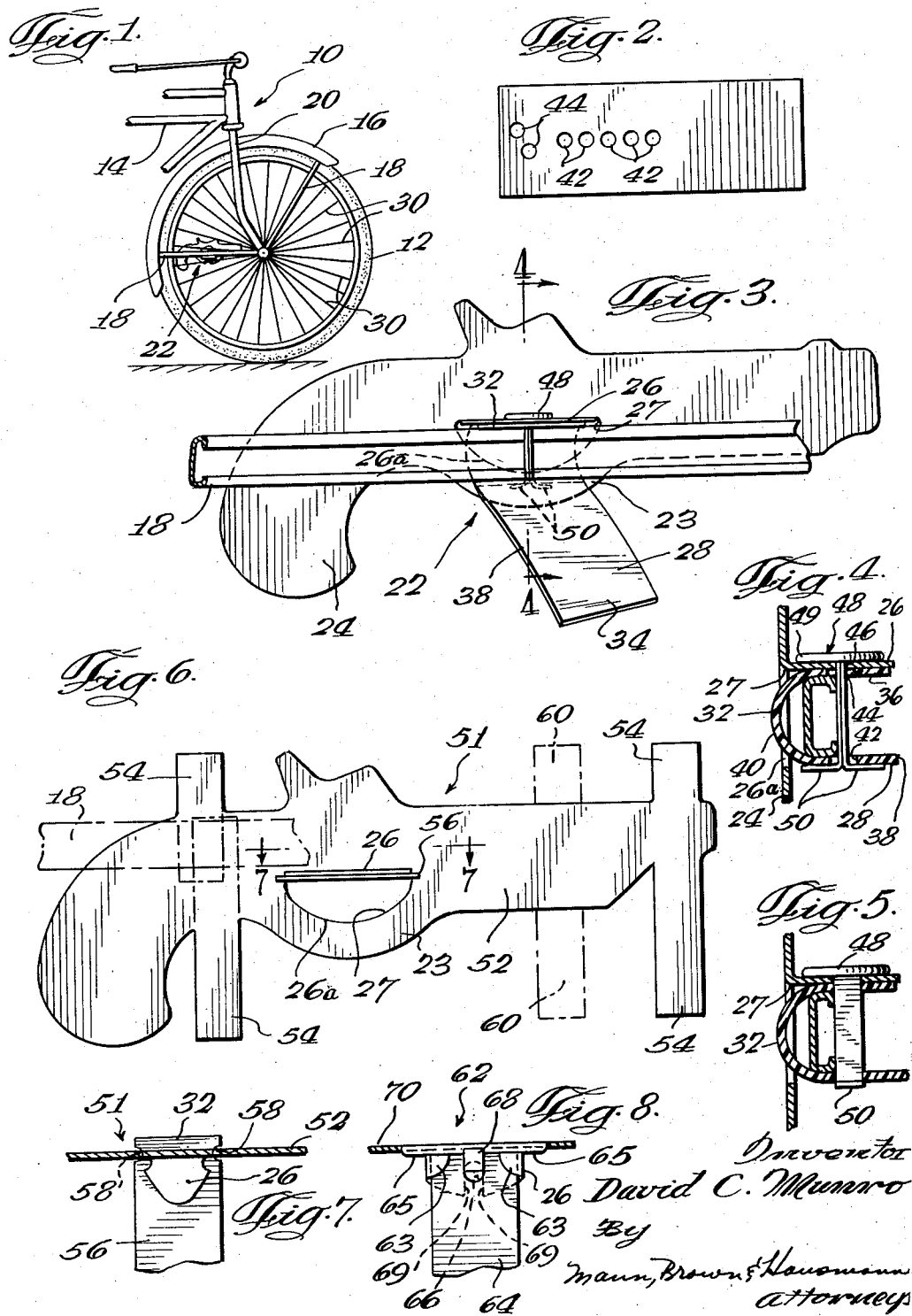

2,894,357

NOISEMAKING ATTACHMENT FOR BICYCLES

David C. Munro, Chicago, Ill.

Application October 4, 1955, Serial No. 538,321

2 Claims. (Cl. 46—175)

My invention relates to a noisemaking attachment for bicycles or the like, and more particularly, to an amusement device adapted to cooperate with the bicycle wheel spokes to produce the well-known clicking noise.

A familiar form of amusement for bicycle riders, particularly those in the younger age groups, is to insert a stick or a rod or a playing card into the path of movement of the bicycle wheel spokes to obtain the characteristic pinging noise. Several forms of attachment devices have been devised for mounting on bicycles to produce this or a similar noise. These devices ordinarily include some form of projecting element that is engaged by the bicycle wheel spokes to provide the desired noise. Youngsters find these devices very desirable, but due to the fact that they include at least several moving parts, and require a secure mounting on the bicycle frame, they are relatively expensive and therefore have only limited market possibilities.

The principal object of the present invention is to provide a bicycle noisemaker or clicker device which includes no moving parts, and which is composed of a minimum of simple elements that provide an unusually attractive and inexpensive attachment for bicycles or the like.

Another important object of the invention is to provide a noisemaker attachment readily adapted for tricycles, which is so constructed that the noise it makes cannot be stopped or turned off by a small cyclist so that the noise the device makes when the cyclist rides the tricycle will apprise motorists of his presence.

A further object of the invention is to provide a bicycle attachment that may be assembled and secured to a bicycle or the like by even the youngest of cyclists.

Still a further object of the invention is to provide a bicycle attachment that may be easily fitted to one of the conventional bicycle fender supports or the bicycle frame forks, between which the wheels are mounted, of most bicycle models.

Another object of the invention is to provide a novel form of advertising or display device that is adapted to be attached to a bicycle or the like which is attractive in appearance, and which produces the clicking noise found desirable by youthful bicycle riders.

Yet another object of the invention is to provide a noisemaking device that requires no tools to apply same to conventional bicycles and tricycles.

Still another object of the invention is to provide simplified and improved securing means for affixing devices of the type hereindescribed to bicycles or the like.

In accordance with the illustrated embodiments of my invention, I provide a sheet of relatively inflexible material, such as aluminum or the like, shaped in the form of, for instance, a pistol of the Davy Crockett era, or a bottle resembling the bottles in which one of the well known soft drinks is sold. The sheet is formed with a generally U-shaped slit that defines a tongue or flange which is adapted to be bent at right angles to the plane of the sheet, leaving a hole or perforation or recess in the sheet. A strip of resilient material, such as nylon or other similar plastic material, is secured to the sheet in said hole and adjacent the tongue. The device is secured to either the bicycle fender supports or to one of the elements forming one of the wheel receiving forks that are a part of the bicycle frame, by either elongate strips or tabs secured to the sheet and wound around these elements, or a fastening element that may also secure the resilient strip to the sheet. Preferably, the device is secured to the bicycle so that the outwardly extending end of said strip projects into the path of the wheel spokes, and the tongue opposes the action of the spokes on the strip.

Other objects, advantages, and uses will be obvious or become apparent from a consideration of the following description and the drawing.

In the drawing:

Figure 1 is a side elevational view of the front wheel of a conventional bicycle with one form of my invention applied to the far side thereof;

Figure 2 is a plan view of one form of resilient strip employed in connection with the attachment shown in Figure 1;

Figure 3 is an enlarged perspective view of the attachment shown in Figure 1 together with a portion of the bicycle fender support to which it is attached;

Figure 4 is a cross sectional view along line 4—4 of Figure 3, with parts broken away;

Figure 5 is a view similar to that of Figure 4 showing the fastening element in a different position;

Figure 6 is a plan view of another form of the device;

Figure 7 is a cross sectional view along line 7—7 of Figure 6, on a smaller scale and with parts broken away; and, Figure 8 is a view similar to that of Figure 7, illustrating a further form of the device.

Reference numeral 10 of Figure 1 generally indicates a conventional bicycle in which only the front wheel 12 is shown, including the frame 14, front fender 16 and the fender supports 18 secured to the front fork element 20 in any conventional manner. One form of my attachment generally indicated by reference numeral 22, is shown attached to the horizontal fender support 18 on the far side of the bicycle 10.

Referring more particularly to Figure 3, the attachment 22 comprises a sheet 24 of relatively inflexible material, such as aluminum, shaped in the form of a pistol of the type generally associated with the Davy Crockett era. Adjacent the curved portion 23 of the sheet 24, which is shaped to conform to a trigger guard, the sheet 24 is slit along the line 26a to define a tongue or flange 26 adapted to be bent at right angles to the main body of sheet 24 leaving a hole or recess or perforation 27. A strip 28 of resilient material, such as nylon or the like plastic, is so associated with the sheet 24 that the outwardly projecting end thereof is engaged by the wheel spokes 30 when the device is secured in place.

In the embodiment of Figures 1–5, one end 32 of the strip 28 is bent on itself to form the strip 28 into a J-shaped element with the other end 34 being substantially plane and unbent. The J-shaped element includes the relatively short leg 36 and the relatively long leg 38 interconnected by a curved web 40. The strip 28 is preferably formed with perforations 42 (see Figure 2) equally spaced along the center of the strip, and at least two staggered perforations 44 at the end 32 thereof, said perforations 44 being spaced apart a distance equal to, for instance, one-half the distance between the perforations 42. The tongue 26 is formed with a perforation 46 adapted to receive, in the embodiment of Figures 1–5, a familiar form of round head paper fastener 48. The paper fastener 48 generally comprises a round head element 49 having secured thereto a pair of flat bendable elongate legs 50. However, any fastener having a relatively wide head and bendable legs will be satisfactory.

As shown in Figures 3 and 4, the device 22 is secured to the fender support 18 by inserting the bent end of the strip 28 partially into the hole 27 and applying these two elements to the support 18 by moving the web 40 adjacent the support 18. The fastener 48 is then inserted through the perforation 46, a perforation 44, and a perforation 42, and the legs 50 are bent away from each other to the positions shown in Figure 4. This secures the device 22 to the bicycle 10 with the outwardly projecting end 34 of the strip 28 being disposed in the path of the wheel spokes 30 to produce the familiar clicking noise when the cyclist pedals the bicycle 10.

The space enclosed by the strip 28 and the fastener 48 may be adjusted by appropriately aligning one of the perforations 42 with a perforation 44 when the fastening element is to be applied to the device. A further range of adjustment may be provided by merely twisting the flat legs 50 of the fastener 48 ninety degrees to the position shown in Figure 5, wherein it will be seen that the edges of the legs will be positioned closer to the web 40 than the sides of the legs are in Figure 4.

The adjustment provided by these features of the invention permit the device 22 to be secured to practically all conventional bicycle models.

While the fender supports 18 of many bicycle and tricycle models are shaped substantially as shown, this element is frequently quite round in cross sectional configuration. Where this is the case, device 22 is preferably fastened to one of the legs of fork element 20. These legs are normally tapered from the lower ends thereof upwardly, so that by sliding the device 22 toward the fender of Figure 1, the encircled element will be securely gripped by the resilient strip and the fastening element 48. In the illustrated form of the device, if the gun were secured to the fork element 20, the gun would be pointed downwardly or upwardly, rather than in the forward direction shown in Figure 1, the latter of which would probably be the most desirable. However, this could be remedied by forming the tongue transversely of the sheet 24, rather than longitudinally thereof.

It will be obvious, of course, that the device 22 could be secured adjacent to the rear wheel of the bicycle 10 rather than the front wheel.

Referring to Figure 3, it will be appreciated that as the bike 10 is moved in a forward direction, the spokes 30 will engage the lower side or surface of the end 34 of strip 28, and move this end upwardly. This action of the spokes is opposed by the tongue 26 through the leg 36 of end 32 bearing against same to provide the snapping action that, in cooperation with the spokes, produces the desired noise. The position of strip 28 could be reversed with respect to the tongue in an alternative arrangement so that the long leg 38 of the strip 28 is secured adjacent the tongue. In such a position, the tongue would directly oppose the action of the spokes. In the embodiment shown in Figures 1–5, the tongue 26 will also oppose the action of the spokes 30 if the device 22 is mounted so that the spokes will engage the other side or surface of strip 28 when the bike is moved in a forward direction, since the fastener element 48 secures strip 28 to the tongue. In this latter instance, however, the strip 28 would be forced away from that tongue rather than toward it.

Figures 6 and 7 illustrate a further and simplified form 51 of the invention adapted to be secured to a fender support 18 or the like. As shown in Figure 6, the modified sheet 52 has a configuration similar to that of Figure 1, but includes a plurality of wrapping strips or tabs 54 that are flexible enough (due to their narrowness in width) to be wrapped around the fender support 18 (shown in broken lines in Figure 6) to position the sheet 52 in a position similar to sheet 24 of Figures 1 and 3, except that the gun would be somewhat closer to the ground by reason of the fact that tongue 26 is positioned below the support 18 rather than above it, as shown in Figure 3.

The modified resilient strip 56 is not perforated in any manner, but instead, is formed at the end 32 thereof with a notch 58 in each side of the strip, as shown more particularly in Figure 7. The end 32 of this strip is inserted into the hole 27 (see Figure 6) by bending the strip along its longitudinal axis, instead of transversely thereof, which reduces its effective width somewhat. After insertion the strip is released and the edge of the sheet 52 defining the hole 27 thereof is received in the respective notches 58. The hole 27 of sheet 52 is thus somewhat shorter in length than the width of the strip 56 in the embodiment of Figure 6.

In an alternate arrangement, the hole 27 is formed in sheet 52 by forcing a sharp flat instrument, such as, for instance, a wood chisel, through this sheet. This forms a tongue 26 on the opposite side of the sheet that is inclined at substantially the same angle that the beveled edge of the tool was inclined. The narrow end of a tapered strip 56 is then inserted into this hole from the outwardly facing side of sheet 52 and moved toward the other side of the sheet until the ends of the slit bear against the side of strip 56. The ends of the slit tend to cut into the edges of the strip 56 to hold the strip in place, and thus form the device 51 in its alternate form.

The device 51 is preferably secured to the fender support 18 so that the tongue 26 thereof opposes the action of the spokes 30 on the outwardly extending end of the strip 56. Thus, device 51 may be secured where device 22 is shown in Figure 1, that is, on the left hand side of the bike 10. This is done by wrapping the tabs or strips 54 around the support 18 as indicated in broken lines in Figure 6. In this position the spokes 30 move the strip 56 against the tongue 26 when the bike is moved in a forward direction to provide the snapping action that produces the desired noise.

The device 51 may be adapted for application to tricycles (the fender supports of which are ordinarily shorter than that found on bicycles) by including a pair of strips 60 where shown in broken lines in Figure 6. The strips 54 at the end of the gun would then be broken off by bending them until they dropped away from the main body of sheet 52.

The device 62 of Figure 8 is similar to that shown in Figures 6 and 7 except that the edges of tongue 26 are slit along lines 65 and are wrapped around the respective edges of the modified resilient strip 64. In addition, the strip 64 is formed with a single perforation 66 and a strip 68, cut down the center of the tongue along lines 69, is inserted through this perforation and bent toward sheet 70, which is similar in form to sheet 52. The device 62 is secured to the same fender support 18 so that the tongue 26 opposes the action of the spokes on the strip 64.

It will be noted that in the forms of the invention shown in Figures 1–5 and 8, the resilient spoke engaging strip is secured to the tongue 26 and therefore that the tongue will oppose the action of the spokes regardless of whether the spokes push the strip toward the tongue or pull it away from the tongue. It will also be noted that the hole 27 provided by the slit provides a space similar to that in which pistol triggers are generally mounted. This preserves the resemblance of the flat sheets (24, 52 or 70) to real pistols. Tongues 26 may be curved, square or rectangular, but are curved in the illustrated embodiments to preserve this resemblance to real pistols.

While the sheets 24, 52 and 70 have been shown in the form of a pistol, they may be given other forms, as will be obvious. They may, for instance, be made to resemble bottles in which well known soft drinks are sold for advertising purposes. They may also be shaped to resemble airplanes, or formed in the shape of foods, such as an ice cream cone, for the same reasons. My invention thus provides a new and attractive advertising medium.

One of the outstanding advantages of my invention is that when applied to tricycles, it cannot be turned off by the youngsters riding them. Thus, the tricycles will make considerable noise when they are being ridden, so that persons operating automobiles near them will be advised of their presence and guide their actions accordingly.

The foregoing description and the drawings are given merely to explain and illustrate my invention, and the invention is not to be limited thereto, except insofar as the appended claims are so limited since those skilled in the art who have my disclosure before them will be able to make modifications and variations therein without departing from the scope of the invention.

I claim:

1. A noisemaking device adapted to be attached to a velocipede support adjacent a spoked wheel thereof comprising a relatively flat sheet of relatively inflexible material, means for securing said sheet to the support, said sheet when secured to said support being disposed in a plane that is substantially parallel to that of the wheel, said sheet being formed with an elongate opening having its major dimension extending generally parallel to the wheel spokes in their positions as they move by said sheet on rotational movement of the wheel, the margin of said opening being coextensive with said major dimension along one side of the opening, an abutment carried by said sheet, said abutment extending substantially parallel to the major dimension of said opening and substantially coinciding therewith, said abutment projecting generally laterally of said sheet, and a strip of relatively stiff resilient material secured to said sheet by having one end thereof received in said opening along said major dimension thereof, said strip including a portion that is of larger transverse dimension than said major dimension of said opening, said portion of said strip including substantially diametrically opposed notches formed in the longitudinally extending edges of the strip, the edge of said sheet defining the margin of said opening being received in said notches to retain said strip within said opening and adjacent said abutment, said strip being of sufficient length to project into the path of movement of the wheel spokes when said sheet is secured to said support.

2. The device set forth in claim 1 wherein said sheet is relatively flat and in outline is shaped to resemble a fire arm, said opening being positioned and proportioned to define the trigger guard of the fire arm.

References Cited in the file of this patent

UNITED STATES PATENTS

| | | |
|---|---|---|
| 1,234,163 | Henderson | July 24, 1917 |
| 2,535,402 | Fleishman | Dec. 26, 1950 |
| 2,624,156 | Meyer | Jan. 6, 1953 |
| 2,667,720 | Connell | Feb. 2, 1954 |
| 2,719,385 | Wilson | Oct. 4, 1955 |
| 2,736,136 | Modlin | Feb. 28, 1956 |